UNITED STATES PATENT OFFICE.

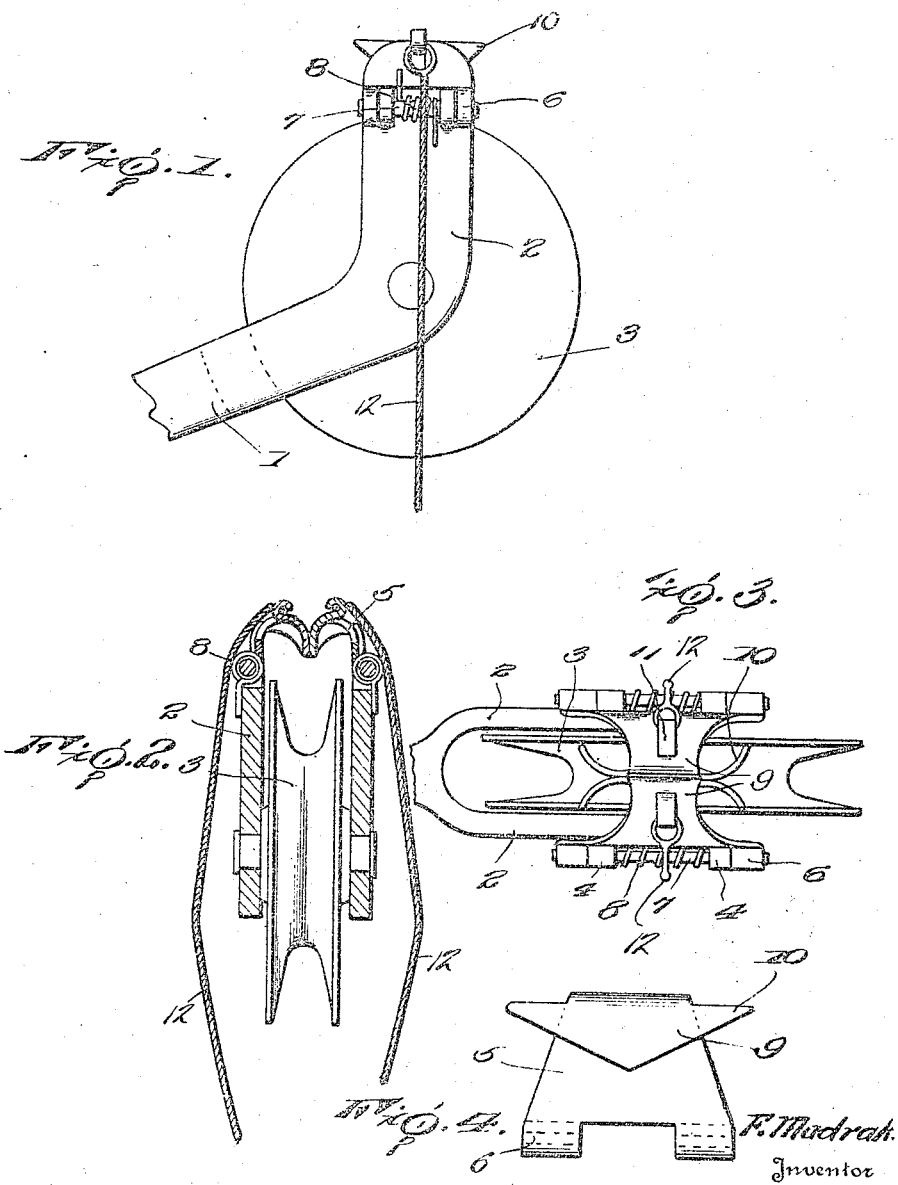

FRANK MADRAK, OF DURYEA, PENNSYLVANIA.

TROLLEY-WIRE HOLDER.

1,375,599.  Specification of Letters Patent.  Patented Apr. 19, 1921.

Application filed May 2, 1918. Serial No. 232,073.

*To all whom it may concern:*

Be it known that I, FRANK MADRAK, a citizen of the United States, residing at Duryea, in the county of Luzerne and State of Pennsylvania, have invented certain new and useful Improvements in Trolley-Wire Holders, of which the following is a specification.

This invention relates to new and useful improvements in trolley wire holders and the primary object of the invention is to provide an attachment for the trolley head which is adapted to securely hold the trolley wire on the wheel and which prevents the wire from becoming disengaged therefrom. This device comprises a pair of spring detents that are engageable over the trolley wire and said detents being releasable by moving the same away from each other so as to permit the trolley to be disengaged from the wire.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:

Figure 1 is a side elevation of the attachment,

Fig. 2 is an end elevation thereof,

Fig. 3 is a top plan view of the holding device, and

Fig. 4 is a side elevation of one of the wing members that project above the trolley head.

In describing my invention, I shall refer to the drawings in which similar reference characters designate corresponding parts throughout the several views. The numeral 1 designates the upper portion of a trolley pole which is provided with the usual type of head formed by bifurcating the upper end thereof to form side members 2, and mounted between the side members is the usual type of trolley wheel 3 for engagement with the trolley wire. The upper edges of the side members 2 of the trolley head are provided with spaced apertured off-set portions 4 that are adapted to form portions of a hinge as will be hereinafter more fully described.

The trolley wire is held on the wheel by a pair of wing members 5 which are provided with off-set portions 6 on their lower edges, and are apertured to aline with the off-set portions 4 on the trolley head and a hinge bar 7 is insertible therethrough. A coil spring 8 is positioned around said bar and the same tends to force the wing members inwardly toward each other.

Each of the wing members 5 is provided with an inwardly and downwardly extending enlargement or head 9 which is substantially semi-circular and the opposite ends thereof are bent outwardly as shown at 10, the purpose of which is obvious. The curved portion 9 of the member 5 provides a downwardly facing pocket for the reception of the trolley wire which latter is prevented from disengagement from the head by its reception within one of the pockets and the arrangement of the hinge bar 7 is such as to prevent the wing member from swinging open under pressure exerted thereon by the trolley wire. The wings are provided with struck up lugs 11 that form loops whereby the ends of a cable or rope 12 are adapted to be connected therewith, to pull said wings outwardly against the tension of the springs 8 so as to permit the trolley head to be disengaged from the wire.

In operation, when the various parts of the device are disposed as is clearly shown in Figs. 1, 2 and 3 of the drawings, it is obvious that the trolley wire will be held in position on the wheel 3 and will be prevented from jumping from the head of the pole by the wing members 5 that are engageable over the same. When it is desired to release the trolley head from the wire, the rope or cable 12 is pulled and as the upper edge thereof is connected with the wings 5 it is obvious that the wings will be pulled outwardly so that their outer faces will be moved from each other to permit the head to be disengaged from the wire. This holding device is very simply constructed, and it is obvious that it will absolutely prevent the wire jumping from the trolley when a car is in operation. The enlarged faces on the outer ends of the wing members insure a positive engagement of said members and prevent the wire forcing said members apart.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:

In combination with a trolley head having a flanged wheel mounted for rotation therein; of spring actuated wings hingedly connected with said head, said wings having enlarged inwardly curved portions to meet each other over the wheel and provide pockets facing toward the wheel, the ends of the curved portions of the wings being bent outwardly toward and in proximity to the flanges of the wheel to prevent displacement of the trolley wire therefrom.

In testimony whereof, I affix my signature hereto.

FRANK MADRAK.